United States Patent [19]

Inoue

[11] 4,289,947

[45] Sep. 15, 1981

[54] FLUID JETTING SYSTEM FOR ELECTRICAL MACHINING

[75] Inventor: Kiyoshi Inoue, Tokyo, Japan

[73] Assignee: Inoue-Japax Research Incorporated, Yokohama, Japan

[21] Appl. No.: 4,987

[22] Filed: Jan. 19, 1979

[30] Foreign Application Priority Data

Mar. 2, 1978 [JP]  Japan .............................. 53-25633[U]
Aug. 28, 1978 [JP]  Japan .......................... 53-117434[U]

[51] Int. Cl.³ ............................................. B23P 1/04
[52] U.S. Cl. ................. 219/69 D; 204/129.6; 204/129.7; 219/69 M
[58] Field of Search ............... 219/69 D, 69 M, 69 V; 204/129.6, 129.7

[56] References Cited

U.S. PATENT DOCUMENTS

| | | | |
|---|---|---|---|
| 2,796,509 | 6/1957 | Blake | 219/69 V |
| 3,378,473 | 4/1968 | Inoue | 204/129.7 |
| 3,384,563 | 5/1968 | Taylor | 204/129.7 |
| 3,594,536 | 7/1971 | Holroyd | 219/69 M |
| 3,663,787 | 6/1972 | Haswell et al. | 219/69 D |

FOREIGN PATENT DOCUMENTS

| | | | |
|---|---|---|---|
| 1071251 | 12/1959 | Fed. Rep. of Germany | 219/69 D |
| 38-3809 | 4/1963 | Japan | 204/129.7 |
| 787731 | 12/1957 | United Kingdom | 219/69 D |
| 834821 | 5/1960 | United Kingdom . | |
| 939402 | 10/1963 | United Kingdom . | |
| 958047 | 5/1964 | United Kingdom . | |
| 1008425 | 10/1965 | United Kingdom . | |
| 367997 | 4/1973 | U.S.S.R. | 204/129.7 |

*Primary Examiner*—C. C. Shaw
*Attorney, Agent, or Firm*—Karl F. Ross

[57] ABSTRACT

A fluid-jetting system is combined with an electrical machining apparatus to direct a plurality of jets of the electrical machining liquid (electrolyte in the case of electrochemical machining or dielectric in the case of spark discharge machining) into the region of the machining gap. The jets derive from respective flexible ducts. Vibrational energy is applied to the fluid fed to the ducts.

24 Claims, 6 Drawing Figures

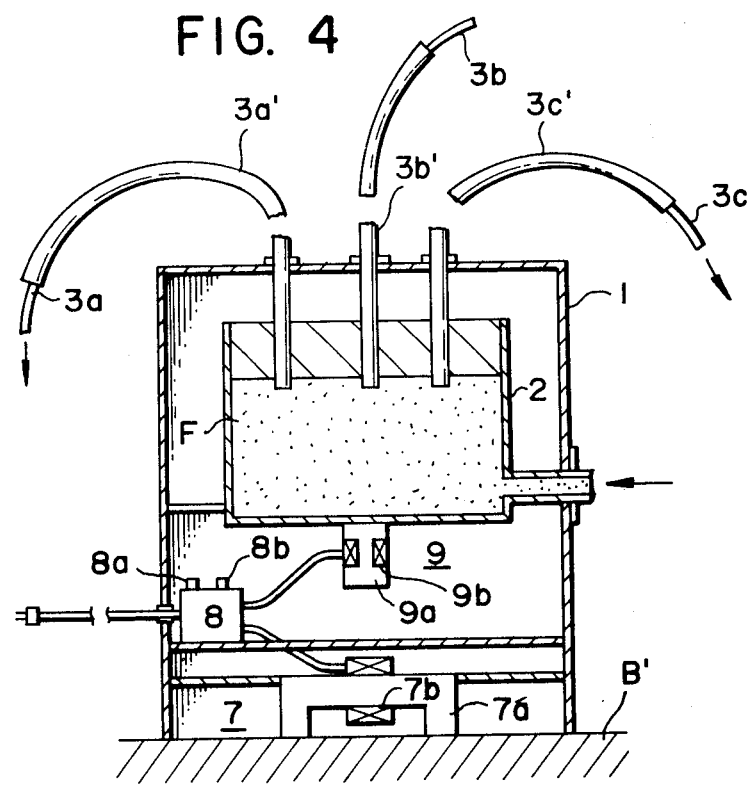
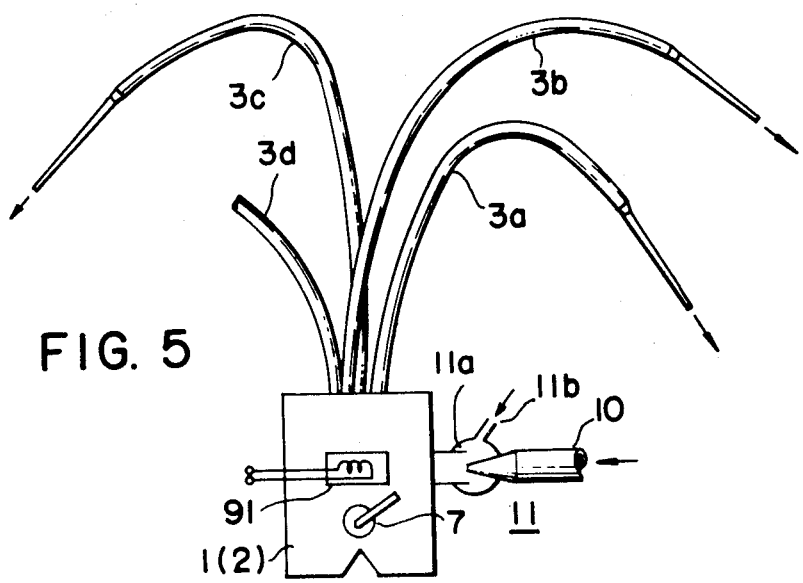

FLUID JETTING SYSTEM FOR ELECTRICAL MACHINING

FIELD OF THE INVENTION

The present invention relates to a fluid jetting system for electrical machining. The term "electrical machining" as used herein is intended primarily to refer to electrical discharge machining (EDM), but it should be understood that the invention is equally applicable to any of other form of electrical machining such as electrochemical machining (ECM), electrochemical grinding (ECG) and electroplating (EP).

BACKGROUND OF THE INVENTION

In EDM, it is customary to provide a minute machining gap between a tool electrode and a workpiece, one or both of which are immersed in a machining fluid. Typically, under such conditions, the machining fluid is flushed through one or more openings provided in either or both of the tool electrode and the workpiece. It is, of course, possible that no such opening may be provided and "flushing" of the machining fluid into the machining gap can be effected periodically by reciprocating the tool electrode or the workpiece. Additionally, it is quite common in practice to utilize a plurality of fluid jetting nozzles directed toward the machining gap to guide introduce into the region of the latter the machining fluid at a relatively high velocity. A series of electrical discharges are created across the fluid-filled machining gap to remove material from the workpiece, thereby imparting to the latter a desired shape in accordance with a shape of the tool electrode.

When, however, these shapes contain irregular curvatures or involve a deep boring or slitting and thus present intricate two-dimensional or three-dimensional forming, the removal of machining chips, tar and gases accumulated at one or more of these portions becomes difficult. It has therefore been a problem with conventional fluid-jetting nozzle systems to assure a uniform decontamination over the entire machining area being processed.

OBJECT OF THE INVENTION

It is accordingly the object of the present invention to provide an improved fluid jetting system for electrical machining whereby a uniform decontamination over the entire machining area being processed is assured.

SUMMARY OF THE INVENTION

In accordance with the present invention there is provided a fluid jetting system for electrical machining, including a distribution fluid chamber with an inlet for receiving a machining fluid and a plurality of flexible fluid delivery tubes leading from said distribution chamber and having their respective nozzle ends positionable in the region of an electrical machining gap for directing respective streams of the machining fluid into different zones as desired, selectively in the region of the gap. Each of said delivery tubes is preferably composed of or coated with an insulating material. In accordance with one aspect of the present invention, an oscillator unit is provided to impart a vibration to the machining fluid within said distribution chamber so that the machining fluid injected from each of said the tubes is activated with a vibrational energy. The vibration is preferably of an ultrasonic frequency, desirably in the range between 10 and 50 kHz. In another aspect of the present invention, each of the tubes is provided at its connection with the distribution chamber with an electromagnetic valve selectively operable by circuitry common to all of the valves so that the valves are sequentially opened and closed to cause said machining fluid to be injected through the different tube nozzles into different zones over the machining area sequentially.

BRIEF DESCRIPTION OF THE DRAWING

In the description which follows, certain embodiments of the invention will be described, reference being made to the accompanying drawing in which:

FIG. 4 is a diagrammatic view of another embodiment of the invention; and

FIG. 5 illustrates still another construction of the fluid jetting system embodying the principles of the present invention.

SPECIFIC DESCRIPTION

Figure 1:
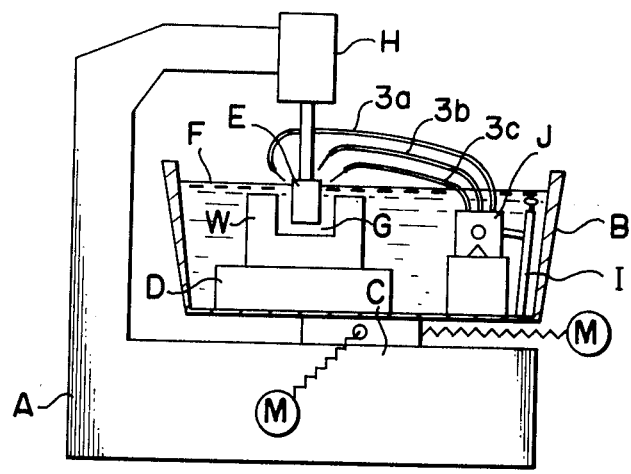
FIG. 1 is a diagrammatic view of an electrical discharge machine incorporating a fluid jetting system assembly of the invention shown in a general form.

Referring to FIG. 1, an electrical discharge machine A includes a work tank B containing a machining fluid F such as kerosine. The work tank B is supported so as to be displaceable in X and Y directions with a cross table on the bed C in a usual manner. Within the tank B there is provided a work table D on which a workpiece W is fixedly mounted. A machine head H carries a tool electrode E which is displaceable vertically and is adapted to feed the tool electrode E relative to the workpiece W so as to maintain a substantially constant gap spacing G therebetween as machining proceeds. A power supply (not shown) is connected across the tool electrode E and the workpiece W to apply a series of machining pulses between them so that an electrical discharge is repetitively created across the machining gap G to remove material from the workpiece W.

Shown at J is a fluid jetting system assembly to be specifically described in connection with FIGS. 2 to 5. The unit J is detachably mounted at a desired location within the work tank B by means of, say, a magnetic chuck as will be described. The assembly J is fed with a machining fluid F through a conduit I, there being provided a pump (not shown) upstream thereof in the usual manner. The assembly J is further provided with a plurality of fluid delivery tubes 3a, 3b 3c to be positioned at selected locations of the machining region of the tool electrode E and the workpiece W so that sufficient flushing machining fluid flows into selected zones in the machining gap G are assured.

Figure 2:
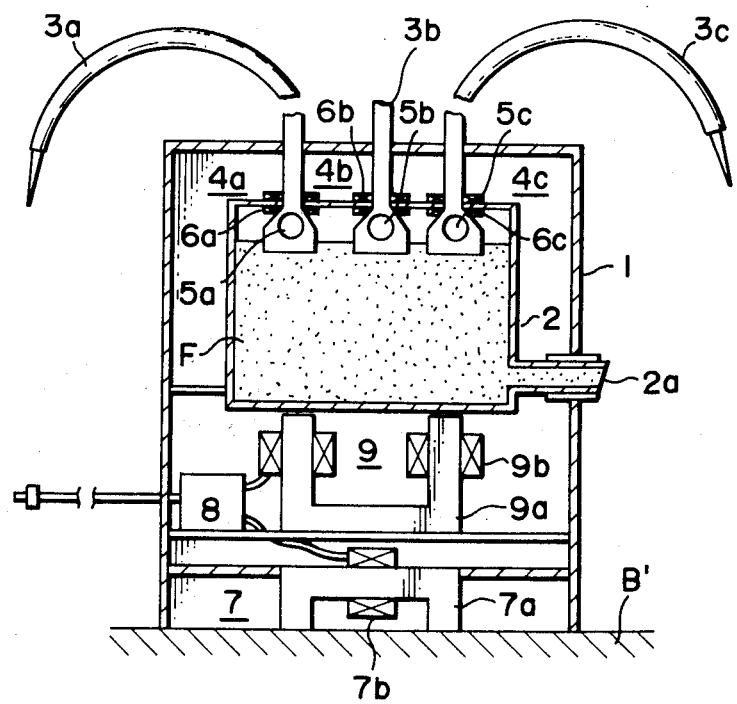
FIG. 2 is an elevational view illustrating a fluid jet nozzle assembly according to the invention.

As shown in FIG. 2, the fluid jetting assembly J has a housing 1 in which a fluid chamber 2 is resiliently mounted. The chamber 2 has an inlet 2a for receiving the machining fluid F through the conduit I (FIG. 1). A plurality of fluid delivery tubes 3a, 3b, 3c shown in FIG. 1 project through the housing commonly 1 from the fluid chamber 2. Each of the tubes 3a, 3b and 3c is moderately flexible to allow deflection so that its end nozzle portion can be directed at a desired location and fixed there. The tubes 3a, 3b 3c may be of stainless steel or a like relatively noncorrodible metal but preferably are composed of or coated with an insulating material such as a plastic so that in case of an occasional contact with the electrode E (FIG. 1) or any other incident the danger of short-circuiting or sparking is effectively prevented.

Each of the tubes 3a, 3b and 3c is provided at its connection with the common fluid chamber 2 with an electromagnetic valve 4a, 4b 4c each comprising a combination of a magnetic valve element (such as steel ball) and a solenoid: 5a, 6a; 5b 6b; 5c, 6c. The solenoids 6a, 6b and 6c are energizable selectively with electric circuitry as shown in FIG. 3a or 3b to draw or repel the corresponding magnetic balls 5a, 5b and 5c to block or open the valves 4a, 4b and 4c, respectively so that the pressurized machining fluid is delivered through the selected jetting tube or tubes into the selected zone or zones in the region of the machining gap G.

The assembly J has a magnetic chuck arrangement 7 comprising a magnetic core 7a attached to the housing 1 and a solenoid 7b energizable by a power supply 8. When the solenoid 7b is energized, the core 7a is magnetized to attract the housing 1 and hence the assembly J to the base B' on which it is placed.

The assembly J is further provided with an oscillatory arrangement 9 comprising a magnetic core 9a having a pair of poles in the proximity of the bottom of the chamber 2 and a solenoid 9b energizable by a power supply 8. When the solenoid 9b is energized by an alternating component of the power supply 8, the alternating field is created to impart a vibration to the chamber 2. The vibration in the sonic or ultrasonic frequency ranges serves to impart a corresponding vibration or harmonics thereof to the machining fluid F within the chamber 2 and hence the fluid F delivered to the region of the machining gap G carried by each of the delivery tube nozzles 3a, 3b and 3c is vibrationally activated.

Figure 3A:
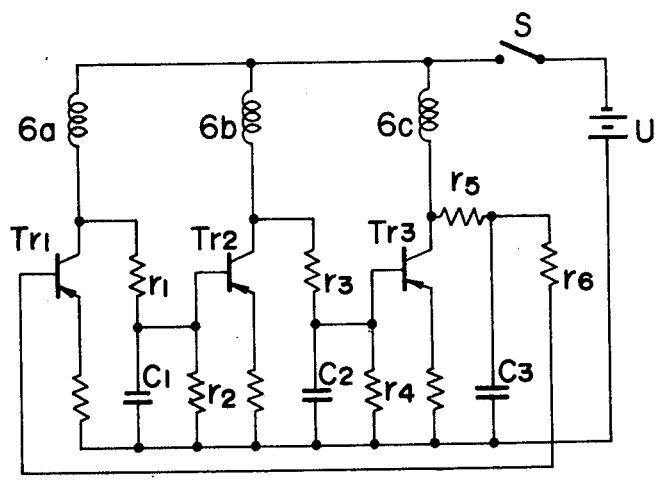
FIG. 3(a) and (b) are circuit diagrams illustrating different circuit arrangements which may be used in connection with the embodiment of FIG. 2.
Figure 3B:
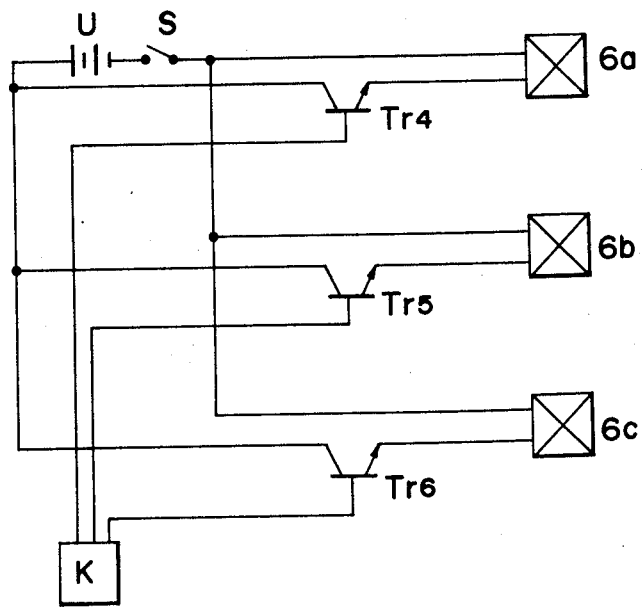

The circuit of FIG. 3(a) comprises a power supply U and an operating switch S connected in series. In the parallel network with the power supply U, the solenoids 6a, 6b and 6c of the electromagnetic valves 4a, 4b and 4c are connected in series with pnp transistor Tr1, Tr2 and Tr3, respectively, whose collector/emitter electrodes are in turn shunted by series networks of resistors and capacitors $r_1$ and $C_1$ $r_3$ and $C_2$; and $r_5$ and $C_3$, respectively. The capacitor and resistor junctions in these circuits are tied to the base electrodes of the next-stage transistors, respectively as shown.

In operation, assume that after turning the switch S on the capacitor $C_1$ is charged. When the charging voltage on this capacitor exceeds the threshold level of the transistor $Tr_2$, the latter is rendered conductive to allow the energizing current to pass through the coil 6b. The energization of the coil 6b causes the magnetic valve element 5b to be attracted thereby blocking the delivery tube 3b. In this state, the capacitor C3 is permitted to charge and thence the transistor Tr1 is rendered conductive to energize the coil 6a. This will cause the ball 5a to be attracted to block the tube 3a while permitting the tube 3b to be open. Likewise, the charging of the capacitor C2 renders the transistor Tr3 to be conductive thereby energizing the coil 6c to attract the ball 5c, so that the tube 3c is blocked while permitting the tube 3a to be open. In this manner, the tubes 3a, 3b and 3c are sequentially opened and blocked so that sequential flushing of the machining fluid over different zones in the region of the machining gap G is effected.

The circuit of FIG. 3(b) employs a ring counter K designed to turn on transistors Tr4, Tr5 and Tr4 arranged to be associated with the solenoid coils 6a, 6b and 6c, respectively so that the latter three are sequentially energized.

The sequential flushing of the machining fluid over different machining zones has the particularly advantageous result that the direction and intensity of the rinsing medium are circularly altered with the medium being switchingly directed at an increased velocity toward the portions in which machining chips, tar and gases are most likely accumulated and deposited to enhance machining efficiency markedly.

The arrangement shown in FIG. 4 is substantially the same as that of FIG. 2 except that the switching valve assembly is omitted and the oscillator unit 9 is directly attached to the fluid receptacle chamber 2. In addition, a pair of operating switches 8a and 8b are shown, the former for activating the DC component of the power supply 8 for operating the electromagnetic chuck 7 and the latter for activating the AC component of the power supply 8 for operating the sonic or ultrasonic vibrator 9.

By oscillating the chamber 2 at a sonic or ultrasonic frequency, the corresponding vibration energy is imparted to the machining fluid F therein. The result is that the machining fluid activated with vibrational energy is injected from each jetting nozzle 3a, 3b, 3c into each gap G area of a minute thickness. The removal of machining chips, tar and gases are thereby effected with high efficiency.

FIG. 5 shows a further embodiment of the present invention in which the same reference numerals designate the same functional parts or elements as the previous embodiments. In this embodiment, there is employed an ultrasonic vibrator 91 as the oscillator unit 9 of the prior examples, the vibrator 91 being directly in contact with the machining fluid F within the housing 1 or the chamber 2 (FIGS. 2 and 4) to impart to the fluid F vibration of a frequency in the range of 10 and 50 kHz which has been found to be particularly advantageous.

The machining fluid upon which a ultrasonic vibration is superimposed as injected from the tube nozzle 3a, 3b, 3c is also obtained with the aid of an aerater unit 11 provided in the embodiment of FIG. 5. This unit comprises an enlarged chamber 11a provided at the inlet of the fluid receptacle 2 of the housing 1 and having an inlet opening 11b exposed to air. The inlet 10 for the machining fluid F (corresponding 2a in FIGS. 2 and 4) enters as an orifice into the chamber 11a. When the machining fluid F (liquid) is introduced under pressure into the fluid receptacle 2 through the chamber 11a, a suction is created therein which effectively draws air from the exterior through the inlet 11b so that an aerated machining fluid is received in the receptacle 2 in the housing 1. With the arrangement already described, the fluid is distributed into the plural nozzle tubes 3a, 3b and 3c for delivery into desired zones of the machining gap G. When with aerated liquid leaves the nozzle 3a, 3b and 3c, the expansion and construction of the entrained air will create an ultrasonic vibration which promotes the rinsing removal of machining chips, tar and gases accumulated at a portion to which the nozzle is directed.

There is thus provided an improved fluid jetting system for electrical machining which assures a uniform decontamination over the entire machining area being processed.

I claim:

1. In an electrical machining apparatus, in combination a workpiece, an electrode spacedly juxtaposed with said workpiece and defining a single machining gap, and a fluid-jetting system, said fluid-jetting system comprising:
   a fluid source;
   a distribution chamber with an inlet connected to said source for receiving an electrical machining fluid therefrom and for distributing the received fluid into a plurality of streams; and
   a plurality of fluid distribution delivery nozzle tubes which are flexible, self sustaining and bendable commonly leading from said distribution chamber and having their respective ends in the form of nozzles positionable independently of said electrode and orientable as desired by manipulating the flexibility of said tubes in different zones in the region of said single machining gap respectively for conducting and directing said distributed streams of said machining fluid from said distribution chamber into said desired different zones in the region of said single machining gap.

2. The combination defined in claim 1 wherein at least in part of said tubes are composed of an insulating material.

3. The combination defined in claim 1 wherein at least in part of said tubes are coated with an insulating material.

4. The combination defined in claim 1, further comprising an oscillator for imparting a vibration to said machining fluid.

5. The combination defined in claim 4 wherein said oscillator is associated with said distributor chamber for imparting said vibration thereto.

6. The combination defined in claim 4 wherein said oscillator is disposed within said chamber for directly imparting said vibration to said machining fluid.

7. The combination defined in claim 4 wherein said vibration is at least partly imparted by an aerator disposed at the inlet side of said chamber.

8. The combination defined in any one of the preceding claims, further comprising electromagnetic valve means associated with said chamber and said nozzle tubes and operable to communicate said chamber and said plural tubes sequentially.

9. In a method of electrical machining wherein an electrode is juxtaposed with a workpiece across a machining gap and a machining fluid is caused to flow through said gap and an electric current source is connected across said gap, the improvement wherein:
   (a) the machining fluid is trained at selected zones in the region of said gap from respective flexible delivery tubes terminating in jet nozzles and supplied from a common chamber; and
   (b) vibrationally activating the fluid at a frequency of about 10 to 50 kHz.

10. The improvement defined in claim 9, further comprising sequentially blocking and unblocking communication between said tubes and said chamber.

11. A fluid-jetting unit in combination with an electrical machining apparatus including a tool electrode spacedly juxtaposed with a workpiece across a single machining gap; said fluid-jetting unit comprising:
   a distribution chamber with an inlet connected to a fluid source for receiving an electrical machining fluid therefrom and for distributing the received fluid into a plurality of streams; and
   a plurality of fluid distribution and delivery nozzle tubes of a self-sustaining and physically flexible construction connected individually to and commonly leading from said distribution chamber and terminating at their respective free ends in the form of nozzles positionable independently of said tool electrode and orientable as desired by manipulating said flexible tubes into different zones in the region of said single machining gap respectively for conducting and directing said distributed streams of said machining fluid from said distribution chamber into said different desired zones in the region of said single machining gap.

12. The unit defined in claim 11 wherein said apparatus includes a worktank for receiving said workpiece as fixedly mounted therein and immersed in said machining fluid, the unit further comprising an attachment to be fixedly mounted in said worktank for supporting said distribution chamber.

13. The unit defined in claim 12 wherein said attachment includes electromagnetic means energizable to retain said attachment fixedly on said work tank.

14. The unit defined in claim 11 wherein at least in part of said fluid distribution and delivery nozzle tubes are composed of an electrically nonconductive material possessing said physical flexibility.

15. The unit defined in claim 11 wherein at least in part of said fluid distribution and delivery nozzle tubes are coated with an electrically nonconductive material.

16. The unit defined in claim 11, claim 12, claim 13, claim 14 or claim 15, further comprising an oscillator for imparting a vibration to said machining fluid prior to said distribution.

17. The unit defined in claim 16 wherein said oscillator is associated with said distribution chamber for imparting said vibration thereto.

18. The unit defined in claim 16 wherein said oscillator is disposed within said distribution chamber for directly imparting said vibration to said machining fluid in said distribution chamber.

19. The unit defined in claim 16 wherein said oscillator is constituted by an aerator disposed at the inlet side of said distribution chamber.

20. The unit defined in claim 16, further comprising electromagnetic valve means associated with said chamber and said nozzle tubes and operable to communicate said chamber and said plural tubes sequentially.

21. The unit defined in claim 17, further comprising electromagnetic valve means associated with said chamber and said nozzle tubes and operable to communicate said chamber and said plural tubes sequentially.

22. The unit defined in claim 18, further comprising electromagnetic valve means associated with said chamber and said nozzle tubes and operable to communicate said chamber and said plural tubes sequentially.

23. The unit defined in claim 19, further comprising electromagnetic valve means associated with said chamber and said nozzle tubes and operable to communicate said chamber and said plural tubes sequentially.

24. The unit defined in claim 11, claim 12, claim 13, claim 14 or claim 15, further comprising electromagnetic valve means associated with said chamber and said nozzle tubes and operable to communicate said chamber and said plural tubes sequentially.

* * * * *